United States Patent [19]

Pierce et al.

[11] Patent Number: 4,612,134
[45] Date of Patent: Sep. 16, 1986

[54] POLYALKYLHYDROSILOXANES AS INORGANIC SILICATE STABILIZERS

[75] Inventors: Richard A. Pierce; Robert T. Jernigan, both of Lake Jackson, Tex.

[73] Assignee: The Dow Chemical Company, Midland, Mich.

[21] Appl. No.: 763,572

[22] Filed: Aug. 8, 1985

[51] Int. Cl.$^4$ .................................................. C09K 5/00
[52] U.S. Cl. ...................................... 252/75; 252/78.3; 528/31
[58] Field of Search ...................... 252/75, 78.3; 528/31

[56] References Cited

U.S. PATENT DOCUMENTS

| | | | |
|---|---|---|---|
| 3,444,225 | 5/1969 | Boissieras et al. | 260/448.2 |
| 4,241,016 | 12/1980 | Hirozawa et al. | 422/17 |
| 4,293,677 | 10/1981 | Imai | 528/15 |
| 4,375,420 | 3/1983 | Knollmueller et al. | 252/78.3 |
| 4,462,921 | 7/1984 | Peterson et al. | 252/78.3 |
| 4,485,025 | 11/1984 | Darden | 252/75 |
| 4,487,906 | 12/1984 | Kniege et al. | 528/31 |

Primary Examiner—Paul Lieberman
Assistant Examiner—Robert A. Wax
Attorney, Agent, or Firm—B. G. Colley

[57] ABSTRACT

Polyalkylhydrosiloxanes that are soluble in glycol are used to stabilize antifreeze/coolant formulations that contain inorganic silicate corrosion inhibitors. The stabilizers have the following formula

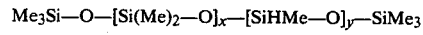

$$Me_3Si-O-[Si(Me)_2-O]_x-[SiHMe-O]_y-SiMe_3$$

where the ratio of x to y is from 0 to about 10.

4 Claims, No Drawings

POLYALKYLHYDROSILOXANES AS INORGANIC SILICATE STABILIZERS

FIELD OF THE INVENTION

The invention relates to stabilizers for antifreeze/coolant formulations and particularly relates to such formulations that contain inorganic silicates as corrosion inhibitors.

BACKGROUND OF THE INVENTION

Antifreeze/coolant formulations containing inorganic silicates as corrosion inhibitors have a tendency to form an irreversible gel after a period of time. Stabilizers improve the gelation resistance of these coolant formulations. The use of organic polysiloxanes to stabilize the inorganic silicates used as corrosion inhibitors in antifreeze/coolant formulations is known in the prior art as is illustrated by U.S. Pat. Nos. 4,462,921 and 4,485,025.

In U.S. Pat. No. 4,462,921, there is disclosed the use of a glycol soluble organosiloxane polymer having the formula

$(CH_3)_3-Si-O-[SiRCH_3-O]_n-Si(CH_3)_3$ where n is an integer from 1 to 20 and R is selected from the group consisting of a cyano-terminated moiety, a diol ether moiety, a carboxylic acid moiety and an amide moiety.

In U.S. Pat. No. 4,485,025, there is disclosed the use of a glycol soluble organosiloxane polymer having the formula

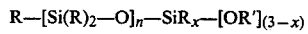

$R-[Si(R)_2-O]_n-SiR_x-[OR']_{(3-x)}$ where R is an alkyl, alkoxy or a solubilizing moiety selected from the group consisting of a cyano-terminated moiety, a diol ether moiety, a carboxylic acid moiety and an amide moiety, R' is an alkyl, aryl, alkaryl or acyl group, x is an integer from 0 to 3 and n ranges from 1 to 5.

Both '921 and '025 claim the use of the respective organosiloxane polymers at levels of about 0.01 to 1 weight percent to prevent gelation of the organic silicates in antifreeze/coolant formulations.

SUMMARY OF THE INVENTION

The invention concerns the stabilization of inorganic silicate corrosion inhibitors used in antifreeze/coolant formulations by the use of an amount, effective to improve gelation resistance, of a glycol soluble organosiloxane polymer, having the formula

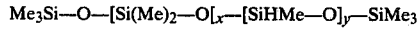

$Me_3Si-O-[Si(Me)_2-O]_x-[SiHMe-O]_y-SiMe_3$ where the ratio of x to y is from 0 to about 10.

DETAILED DESCRIPTION OF THE PREFERRED EMBODIMENTS

The use of silicates as corrosion inhibitors in alkylene glycol coolant formulations is well known in the art. The stabilizer useful in this invention is represented by the following formula

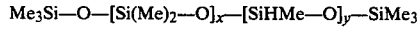

$Me_3Si-O-[Si(Me)_2-O]_x-[SiHMe-O]_y-SiMe_3$ where the ratio of x to y is from 0 to about 10, preferably 0 to about 2[1]. These organosiloxane polymers effectively resist gelation when used at levels of about 0.001 to 0.1 weight percent, preferably about 0.01 weight percent or higher. The upper limit primarily depends upon the solubility of the specific compound in coolant formulations.

[1] Compounds having the subject formula can be manufactured using the procedures described in Noll, W., "Chemistry and Technology of Silicons", Academic Press, Inc., New York 1968, pp. 190-202. Specific compounds are available from General Electric or Dow Corning and are generally mixtures having average x and y values.
[2] Dow Corning Experimental Sample No. E-1933-83J.

The method of this invention will be further illustrated by the following examples which are not intended to limit the invention.

EXAMPLE 1

(Comparison)

An ethylene glycol coolant formulation was prepared containing 0.3 weight percent of $Na_2SIO_3.5H_2O$ as a corrosion inhibitor. This coolant formulation was divided into equal portions. One portion was placed in an oven at 65° C. without the addition of a stabilizer. A gel was observed in 9 days.

EXAMPLE 2

To the same coolant formulation prepared in Example 1 was added 0.01 weight percent of an organic siloxane polymer having the formula disclosed by this invention where x averages about 7 and y averages about 5[2]. Gel formation was visible in this sample after 21 days at 65° C. Therefore, this compound increased the gelatin resistance of the coolant formulation by a factor of 2.3.

EXAMPLE 3

To the same coolant formulation prepared in Example 1 was added 0.01 weight percent of an organic siloxane polymer having the formula disclosed by this invention where x is about 0 and y averages about 27[3]. Gel formation was visible in about 18 days at a temperature of 65° C. Therefore, this compound increased the gelation resistance of the coolant formulation by a factor of about 2.

[3] General Electric Commercial Product No. DF-1040.

EXAMPLE 4

Using the same procedures as described in Examples 1 through 3, the following compounds exhibited similar improvements in gelation resistance:

| x | y | Stability at 65° C. (days) | Improvement Factor |
|---|---|---|---|
| 2 | 3 | 20.3 | 2.24[4] |
| 2 | 2 | 19.7 | 2.19[5] |
| 1 | 2 | 17 | 1.89[6] |
| 3 | 2 | 17 | 1.89[7] |

[3] General Electric Commercial Product No. DF-1040.
[4] General Electric Experimental Sample No. 104-2990.
[5] General Electric Commercial Product No. 104-2988.
[6] General Electric Experimental Sample No. 104-2987.
[7] General Electric Commercial Product No. 104-2989.

EXAMPLE 5

(Comparison)

A portion of the coolant formulation from Example 1 was placed in an oven at 80° C. 49 days after the formulation was prepared. Gel formation was visible after 1 day.

EXAMPLE 6

Simultaneous with Example 5, to a portion of the 49 day old coolant formulation was added 0.01 weight percent of an organic siloxane polymer disclosed by this invention where x averaged about 2 and y averaged about $3^4$. Gel formation was visible after 4 days at 80° C. Thus, this compound increased the gelation resistance the coolant formulation by a factor of 4.

EXAMPLE 7

Simultaneous with Examples 5 and 6, about 0.001 weight percent of the organic siloxane polymer used in Example 6 was added to the 49 day old coolant formulation. Gel formation was visible in 1 ½ days at 80° C. Thus, this compound increased the gelation resistance of the coolant formulation by only a factor of 1.5 at this lower concentration.

We claim:

1. A gelation resistant glycol composition comprising:
   (a) an alkylene glycol, an alkylene glycol ether or mixtures thereof,
   (b) an amount of an inorganic silicate effective to reduce corrosion, and
   (c) an amount, effective to resist gelation, of a glycol soluble organosiloxane polymer having the formula $$Me_3Si-O-[Si(Me)_2-O]_x-[SiHMe-O]_y-SiMe_3$$

where the ratio of x to y is from 0 to about 10.

2. The composition of claim 1 wherein the amount of organosiloxane polymer ranges from about 0.001 to about 0.1 weight percent based on the total composition.

3. The composition of claim 1 wherein the amount of organosiloxane polymer ranges from about 0.01 to about 0.1 weight percent based on the total composition.

4. The composition of claim 1 wherein the organosiloxane polymer has a ratio of x to y of from 0 to about 2.

* * * * *